United States Patent
Debailleul

(10) Patent No.: US 7,032,847 B1
(45) Date of Patent: Apr. 25, 2006

(54) METHOD AND INSTALLATION FOR SEPARATING CONSTITUENTS OF USED TIRES

(76) Inventor: Gérard Debailleul, Kothemstraat 113, Schepdaal (BE) 1703

( * ) Notice: Subject to any disclaimer, the term of this patent is extended or adjusted under 35 U.S.C. 154(b) by 0 days.

(21) Appl. No.: 10/070,918

(22) PCT Filed: Nov. 20, 1998

(86) PCT No.: PCT/BE98/00180

§ 371 (c)(1),
(2), (4) Date: Aug. 20, 2002

(87) PCT Pub. No.: WO99/27004

PCT Pub. Date: Jun. 3, 1999

(30) Foreign Application Priority Data

Nov. 20, 1997 (BE) .................................... 9700933

(51) Int. Cl.
*B02C 19/00* (2006.01)
*B02C 23/00* (2006.01)
(52) U.S. Cl. ........................ 241/1; 241/23; 241/24.17; 241/65; 241/79.1; 422/255
(58) Field of Classification Search .................... 241/1, 241/23, 24.17, 65, 301, 79.1, DIG. 31; 422/243–291, 422/449.1–449.7
See application file for complete search history.

(56) References Cited

U.S. PATENT DOCUMENTS

| 4,049,588 | A | * | 9/1977 | Lee et al. | ................... 521/42.5 |
| 4,161,464 | A | * | 7/1979 | Nicholas | .................... 521/41.5 |
| 4,250,158 | A | * | 2/1981 | Solbakken et al. | ...... 423/449.6 |
| 5,798,394 | A | * | 8/1998 | Myers et al. | ............... 521/42.5 |

FOREIGN PATENT DOCUMENTS

FR            0070789        *    7/1982

\* cited by examiner

*Primary Examiner*—Derris H. Banks
*Assistant Examiner*—Shelley Self
(74) *Attorney, Agent, or Firm*—Akerman Senterfitt

(57) ABSTRACT

The invention concerns a method for treating tyres, belts, inflatable boats, boots and other manufactured articles containing rubber, polymers and reinforcing elements, which is a close circuit system consisting in immersing the waste materials to be treated in a hot alkaline hydroxide bath, followed by neutralization of the resulting materials with a weak mineral acid solution for industrial re-use of said materials.

24 Claims, 3 Drawing Sheets

METHOD AND INSTALLATION FOR SEPARATING CONSTITUENTS OF USED TIRES

CROSS REFERENCE TO RELATED APPLICATIONS

This application is the U.S. National Stage of International Application No. PCT/BE98/00180 filed 20 Nov. 1998, and Belgian Application No. 9700933 filed 20 Nov. 1997. The entirety of each of those applications is incorporated herein by reference.

BACKGROUND OF THE INVENTION

The present invention relates to a process and a plant for the treatment of vulcanized rubber of all kinds, such as tyres, conveyor belts, boots, shoes and other objects containing assembled rubber and polymer materials for the purpose of recycling the components by the relevant industries.

The bulk of these materials is represented above all by the increase in road transport development which gives rise to worrysome quantities of downgraded tyres difficult to remove and possibly to recycle.

It should not be forgotten that more than 3 billion tyres, merely from private vehicles, are running along the roads in the various countries and, of course, have to be periodically replaced. In terms of weight, this represents at least 18 million tonnes of bulky waste which has to be disposed of, something which represents a serious ecological problem difficult to solve, and above all since people are becoming increasingly aware of environmental problems and regulations.

A vast quantity of tyres is destroyed by incineration and in cement kilns with recovery of thermal energy. This approach is being increasingly questioned because of the atmospheric pollution and of the destruction of materials which are beneficial to recover.

Another process consists of successive grinding so as to end up with small particles that can be used as fillers in bitumens and asphalts. Such grinding has been facilitated by cryogenic techniques. However, multiple shredders, which are indispensable for shearing the metal reinforcements, in order to produce reusable powder, are heavy machines which devour energy and are consequently very expensive.

Another destruction process, with recovery of certain components, is based on pyrolysis. The recycling consists in recovering the pyrolysis oil, the carbon and the metals. These processes are high-performance processes but they require the investment of large sums of money and high treatment costs, they are often the source of significant atmospheric pollution.

Thus efforts have been intensified to develop methods for stripping this bulky waste in a manner which is effective, economical and environmentally non-polluting. Considerable research has been focused on the problem, which obviously does not concern only worn tyres but all manufactured products made of rubber and also the waste accompanying the manufacture of these products, these often being reinforced with metal reinforcements or reinforcements made of synthetic materials. The ultimate problem does not reside only in the economical destruction of the rubber element or of the tyres, but it is also desirable to be able to recover and reuse them, or some of the components, for the purpose of avoiding unnecessary wastage of beneficial materials.

With the aim of illustrating the prior art in this field, it is appropriate to mention the following publications:

GB 2,026,144 (1979) discloses a plant for the treatment of rubber waste and of synthetic materials coming from worn tyres. Thermal decomposition of the product, which is coarsely reduced, is carried out in a fluidized bed of sand at 800° C. in the presence of oxygen. The gases produced by the decomposition are used and, at the end of the process, the reinforcing metals are recovered by means of magnets.

U.S. Pat. No. 4,426,459 (prior. JP 1980) discloses a process for the decomposition of vulcanized rubber by a treatment around 100° C. with an organic solvent in the presence of an alkaline hydroxide such as potassium hydroxide.

DE 3,313,470 (1983) relates to a method and to an apparatus for treatment at a temperature above 200° C. for 10 to 35 minutes in a liquid phase composed of spent mineral oils and of organic solvents. A viscous product is obtained which can be used as an additive in bitumens or insulation layers.

WO 97/1561 (prior. U.S. 1995 and 1996) describes a process for the devulcanization of rubber coming from downgraded tyres by desulphurization at around 300° C. by means of an alkali metal in a medium that does not contain oxygen, before or during a treatment by an organic solvent after having separated the constituents of the tyres, such as the steel and other reinforcements.

Many of these processes have disadvantages, namely from the standpoint of the investments, of the efficiency, of the complexity, of the environment or of the market.

SUMMARY OF THE INVENTION

The object of the present invention is to remedy these drawbacks and to propose a process and a simple plant allowing separation of vulcanized and/or bonded rubber waste, such as tyres, belts or other objects, and allowing the constituents to be recovered for reuse by industry, without endangering the environment. The separation of the rubbers from the other materials and metal or other reinforcements is easily accomplished, quickly and economically, the reinforcements made of synthetic resins being dissolved and the metal recovered. Thus, it is possible to provide industry with quality products at competitive prices.

The process essentially comprises the following steps:

A) The reinforced or non-reinforced, vulcanized-rubber waste is coarsely reduced by cutting it up by means of a saw, preferably of the guillotine type fitted with cutters in a grating in order to obtain fragments 10 to 25 cm in length. The sole purpose of this is to reduce the size and thus facilitate handling during the treatment process.

B) The reduced waste is introduced into a reactor and treated for 30 minutes at 350° C. with an $OH^-$ ion generator, preferably a strong alkaline base such as molten NaOH. 3. Separation of the basic liquid and the residues coming from the treated rubber.

C) Neutralization of the residues with an acid, such as phosphoric acid;

D) Recovery and separation of the rubber constituents and the metals used for reinforcement.

Destruction of some of the bonds between the rubber and the other reinforcing materials is achieved by the action of a strong alkaline base, such as molten NaOH which is maintained at a temperature of 350° C. for approximately 30 minutes.

It is important to point out that the consumption of basic agent is very low and the etching liquid can be reused several times, by recovery and reinjection; the volume of the NaOH liquid product circulating will be automatically readjusted if necessary by a fresh addition of the product. Moreover, it should be emphasized that the process according to the present invention does not involve any organic solvent. In addition, it works with waste which is only coarsely cut up and the substances serving for the proposed treatment are well known, commonly employed and inexpensive.

The plant for implementing the process is relatively simple and does not entail inordinate investment.

BRIEF DESCRIPTION OF THE DRAWINGS

The details of the process according to the present invention will emerge from the description of the plant which relates thereto, the description being given by way of non-limiting example.

DETAILED DESCRIPTION

Figure 1:
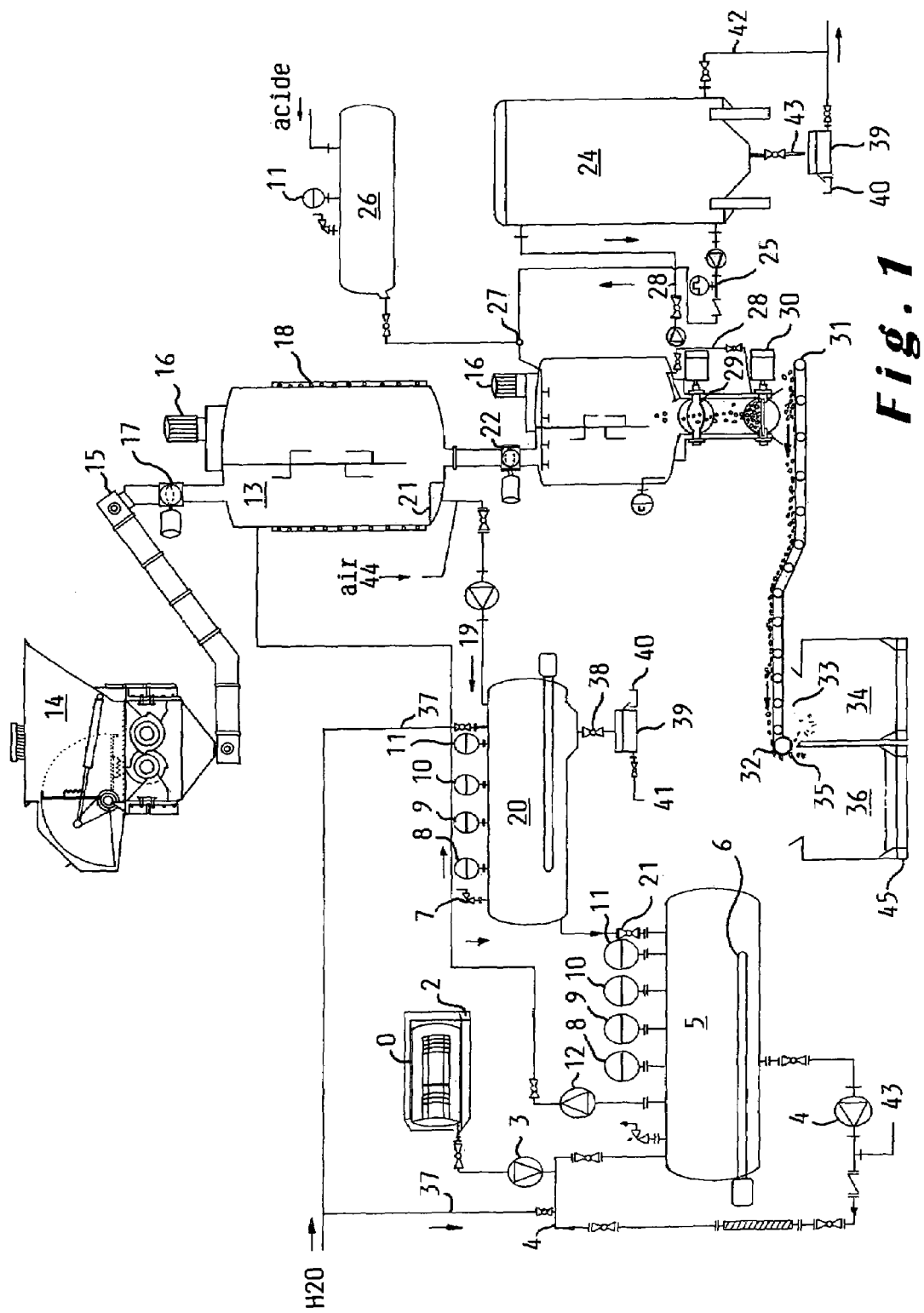
FIG. 1 shows schematically the overall plant.

As shown in FIG. 1, crystallized NaOH in its original package is melted in the oven 1, at a temperature of 300 to 400° C., before being introduced into the master tank 5, which is provided with a heater and in which the NaOH is maintained at a temperature of 380° before being transferred to the reactor 13 into which the waste coming from the cropper 14 is also introduced. After 30 minutes of immersion and with stirring at the start of obtaining a temperature of 350° C., the liquid is conducted by the line 19, provided with a pump, to the buffer tank 20 and then sent to the master tank 5. The buffer tank is heated to a temperature of 380° C. in order to prevent heat shocks occurring in the tank 5. Moreover, the buffer tank is designed to gather the precipitates and is organized for the separation and extraction of the small particles. The decomposition products from the reactor 13 are transferred to the neutralization tank 23 and, at the end of the treatment, the residues are transported to the magnetic sorting device 32 where the metals are separated from the polymers resulting from the treatment.

Figure 2:
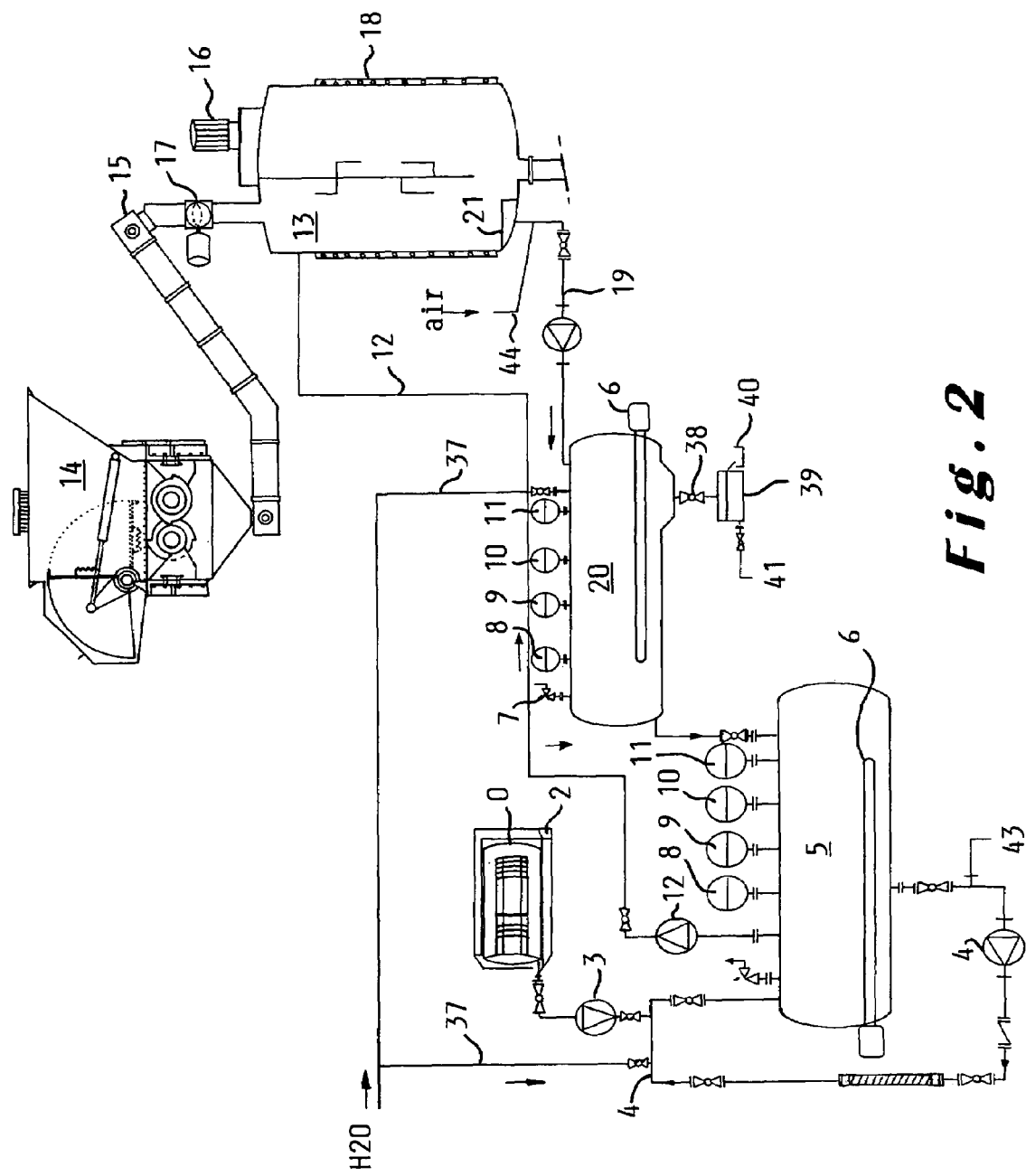
FIG. 2 shows, on a larger scale, the first part of one of the possible embodiments of the plant.
Figure 3:
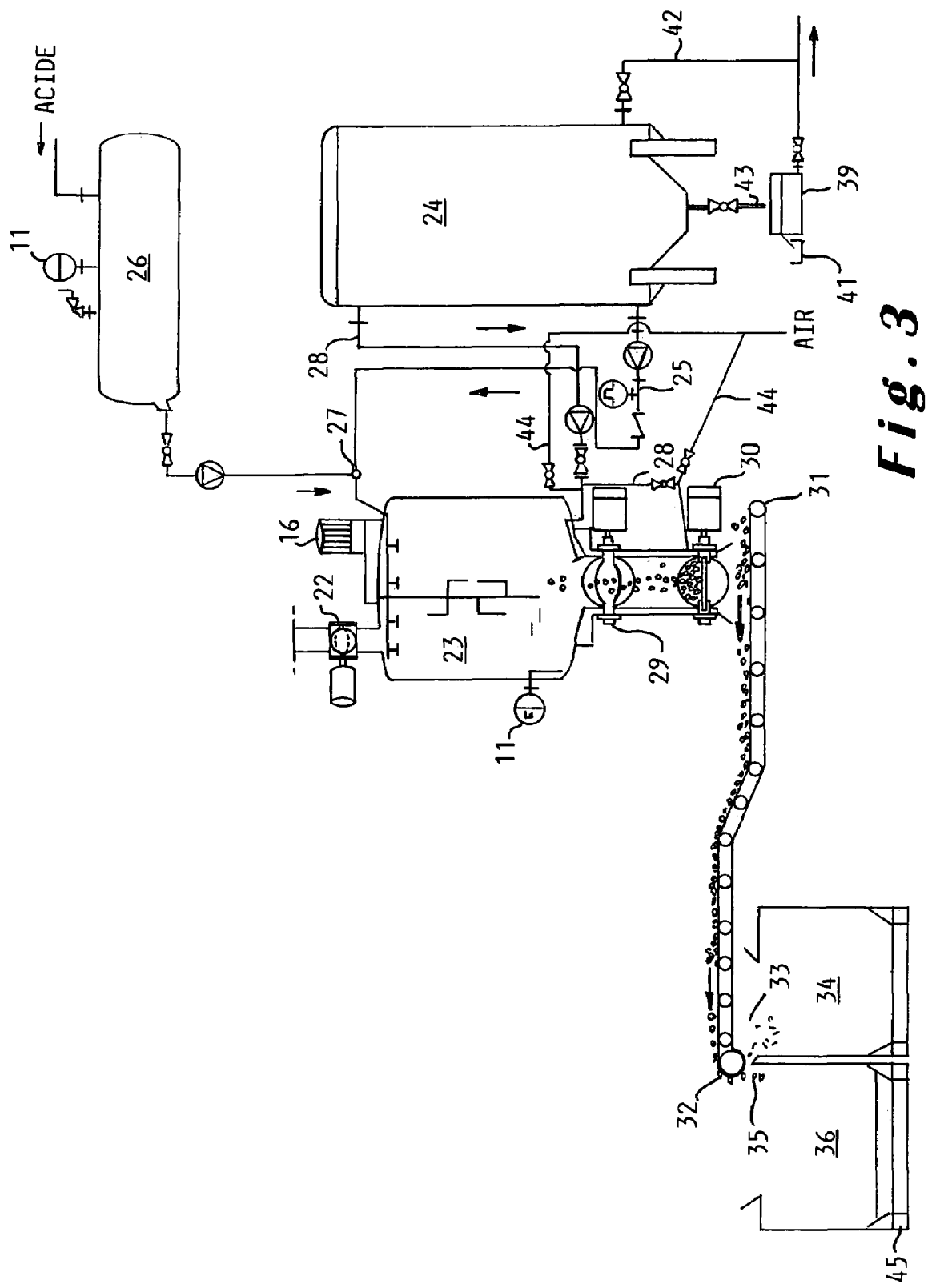
FIG. 3 shows, on a larger scale, the second part of one of the possible embodiments of the plant.

According to this embodiment illustrated in greater detail in FIGS. 2 and 3, a drum 0 containing crystallized NaOH is introduced into the oven 1, which matches the shape of the drum, in which oven the NaOH is heated to a temperature of at least 380° C. The upper part and the straight vertical part of the oven form a cover which opens about the spindle 2 fastened to the bottom right of the oven in order to allow the drum to be easily loaded. A connection tube running to the pump 3 is introduced and connected to the bung of the drum.

The liquified NaOH is transferred to the master tank 5 in which it is maintained at 350° C.

The master tank 5 is equipped with conventional monitoring and control instruments 8 to 11, known to those skilled in the art, which monitor the conditions in the tank and actuate the electronic control actuators when transfers are made and when other actions are taken. The regulatory safety valve 7 prevents unexpected and accidental overpressures and the heating element 6 (which may be placed on the outside, between the insulation, by heating coils conveying a warm liquid) keeps the temperature constant inside the tank.

The liquid is sent via the line 12, fitted with a pump, into the reactor 13 and the waste, cut up in the cropper 14, advantageously a guillotine, is sent by the chain conveyor 15 into the reactor 13, the solid materials must be immersed, the amount of caustic liquid is attained by the operation and control of a probe which also actuates the closure of the valve 17 and the start of the stirring provided by the mixer 16. The temperature of the reactor is maintained by the heating system 18. After approximately 30 minutes treatment at 350° C., the materials are deconsolidated, the caustic liquid is extracted by the line 19, fitted with a pump, through a filter 21, to the buffer tank 20. The filter 21 retains the particles greater than 1 mm. It is unclogged suddenly by closing the valve of the line 19 and sending compressed air 44 into that part of the line 19 which is connected to the tank 13.

The buffer tank 20 is equipped with the same monitoring, control and heating apparatuses as the tank 5; it has a configuration which allows settling and reheating of the caustic liquid to the temperature of 350° C. in order to avoid thermal shocks and the risk of crystallization in the master tank 5. The liquid in the decanted part and at the correct temperature in the buffer tank 20 is then sent back via the line 21, by gravity, slowly into the master tank 5.

When all the caustic liquid has been withdrawn from the reactor 13, the large valve 22 is opened and releases, by gravity, the materials in the reactor 13 into the neutralizing tank 23.

The neutralizing liquids for the above treatments and for cleaning the plant, coming from the tank 24, are conveyed by the line 25, fitted with a pump, to the neutralizing tank 23 into which the liquid is injected by sprayheads. The phosphoric acid coming from the tank 26 passes via the mixing unit 27 through the line 25. The materials and the liquid are vigorously stirred. The pH meter 11 sets the pH=7 after a little more stirring, there is a hold period in order to allow the suspended materials to precipitate, the neutralized liquid is extracted just at the point of connection of the line 28, fitted with a pump, to the tank 23. Injections of air 44 into this line have the purpose of clogging the filter installed at the end of the line 28.

The neutralized liquid having been withdrawn, the large valve 29 is opened while the valve 30 remains closed. The neutralized liquid is found in the tube with the materials between the two valves 29 and 30, it is withdrawn through the bypass of the line 28, the bypass also being equipped at the end of the line with a filter unclogged by sudden injections of air 44, and then the liquid is directed into the tank 24. After removing the rest of the liquid, the valve 30 is gradually opened so as to release the solid material coming from the neutralizing tank 23.

The material is transported by a conveyor belt to the magnetic pulley 32 located at the end of the belt. The metals 33 are precipitated into the container 34 and the non-magnetic materials 35 end up in the container 36. The container 36 is provided with a double bottom, the material being deposited on the first bottom provided with a stainless steel filter whose porosity is less than 10 microns. The material is dried by liquid flow via a lateral pipe 45. The containers 34 and 36 are superposable and have opening bottoms.

Liquified NaOH has a boiling point greater than 1000° C.; there is no pressure formation in the plant, however the equipment is designed to withstand a pressure of 10 bar in anticipation of possible heat shocks.

As this is a heat treatment, it is preferable to work continuously as long as possible. For this purpose, and in order to avoid shut downs due to the build-up of impurities and small particles, cleaning devices are provided for removing them, without having to stop the production. After a number of treatments and in anticipation of cleaning the buffer tank 20, the NaOH liquid in the master tank 5 will be taken to the minimum level in order to receive the entire solution stored in the buffer tank 20, up to the level of the tap on the line 21. Next, water will be slowly added via the line 37 to the rest of NaOH liquid, bottom of the buffer tank 20 for a direct dilution to the point of non-crystallization (concentration +/−40%). After this dilution, the valve 38 is opened on a vibrating screen 39 having a porosity of 10 microns. The solid particles are removed to a container 40 and will be able to be transferred thereafter to a washing tank external to the system with a filter press for the impurities precipitated by the neutralization and for recovering the materials to be recycled in a container of the 36 type. The 40% NaOH solution is recovered via the outlet 41. It will be put into drums and sold for another use or else introduced into the tank 24 in order to obtain a neutralizing agent and thus increase the profitability of the process.

Cleaning during production of the storage tank 24 is also provided. This tank having fed the neutralizing tank 23, the surplus neutral liquid will be withdrawn up to the level of the tap of the line 42 in order to be put on standby in the neutralizing tank 23. This will be organized during the time for a treatment of the reactor 13 and for the neutralization which occupies the liquid. Provision shall be made for the tank 24 to be cleaned and for the liquid in the tank 23 to be returned to 24 during this reaction and neutralizing time.

When the lower level corresponding to the tap of the outlet 42 is reached, the valve 43 opens and releases the particle-laden neutral liquid onto a vibrating screen identical to 39. The liquid is removed and the particles recovered.

During temporary shut-down or shut-down of short duration of the plant, the heating of the master tank 5 and possibly buffer tank must not be cut off. For a complete shut-down, it will be essential to drain, while hot, the buffer tank 20 to the master tank 5 and then via the line 43, connected to a battery of drums in which the solution will crystallize. To reuse the NaOH, the drums will be placed in the oven 1.

For the neutralization, the process makes use of acids, preferably phosphoric acids for the neutralization. It is quite conceivable to use materials such as phosphoric acid solutions regarded as waste in the industry—this waste is available in large quantity. The process accepts various concentrations, even low concentrations, the adjustment is done automatically. Consequently, the system may be regarded as a neutralization centre for these acids, constituting an appreciable financial plus, thus reducing the cost of the main treatment forming the subject of the present invention.

The recovered metals will be sent to the steel industry.

The other materials recovered from the tyres are friable and are converted into a fine powder with slight pressure. Devulcanization is not complete but the breaking of certain bonds is ensured. The friable nature and the polymeric composition of the residue make thereof a beneficial filler material, to be recycled in the manufacture of tyres and rubber articles, and for other non-limiting applications, such as in bitumens or other bituminous mixes.

It is obvious that the present invention is in no way limited to the embodiment as described in the illustrative embodiment shown in FIGS. 1, 2 and 3. Variants may be made to it without thereby departing from the scope of the claims.

The invention claimed is:

1. A plant for implementing a process for treating vulcanized-rubber waste, wherein the process for treating vulcanized-rubber waste includes the steps of:
   coarse cutting of said waste into fragments,
   attacking said fragments using a molten pure base under temperature conditions causing, in the presence of molten pure cast NaOH as the molten pure base, deconsolidation of the vulcanized rubber waste into deconsolidated solid fragments of polymeric composition:
   separating said molten base from said deconsolidated solid fragments;
   neutralizing said deconsolidated solid fragments; and
   recycling or reutilizing the neutralized, deconsolidated solid fragments wherein the plant forms a completely closed system, with no atmospheric pollution, the plant comprising:
   a device for melting said molten pure base;
   a reactor connected to said melting device, into which said vulcanized- rubber waste, which has been coarsely cut into pieces, and said molten pure base are introduced, and in which reactor temperature conditions are applied causing deconsolidation of the vulcanized-rubber waste into solid fragments of polymeric composition;
   a separating device connected to an outlet of said reactor and allowing the molten base to be separated from the deconsolidated solid fragments;
   a neutralizing device fed with neutralizing agent from a source of neutralizing agent, in which device the deconsolidated solid fragments are neutralized; and
   a device connected to the neutralizing device for sorting the neutralized, deconsolidated solid fragments.

2. The plant according to claim 1, wherein said separating comprises sedimentation of the deconsolidated fragments, separated beforehand from the molten base, in a settling and neutralizing liquid, and, after removal of the settling and neutralizing liquid, recovery of the deconsolidated fragments.

3. The plant according to claim 1, further comprising a device for recycling of the molten pure base.

4. The plant according to claim 1, that wherein the molten NaOH treatment temperature is at most 400° C.

5. The plant according to claim 1, wherein the deconsolidated solid fragments comprise metal fragments and fragments made of synthetic material and wherein the process furthermore includes sorting between the metallic and synthetic deconsolidated fragments before they are recycled or reutilized.

6. The plant according to claim 1, wherein the deconsolidation takes place in a closed reactor, the waste to be treated being completely immersed.

7. The plant according to claim 1, wherein the neutralizing uses at least one dilute acid.

8. The plant according to claim 1, wherein the reactor has closeable inlet and outlet openings, stirring equipment, and wherein said separating device comprises a filter capable of retaining particles greater than 1 mm inside the reactor.

9. The plant according to claim 1, wherein the neutralizing device comprises: a tank provided with an inlet communicating with an outlet of the reactor; and with an outlet; the inlet and outlet being closeable; stirring equipment; and a filter in an output line.

10. The plant according to claim 1, wherein the neutralizing device comprises a tank for injection of neutralized liquid and for recovery.

11. The plant according to claim 1, wherein the neutralizing device comprises another tank which contains acid waste and is connected to a mixing unit.

12. The plant according to claim 1, further comprising devices for cleaning precipitates and small particles in the NaOH.

13. The plant according to claim 1, wherein the device for sorting comprises a device for transporting the deconsolidated materials with magnetic separation of metallic materials.

14. The plant according to claim 1, wherein the vulcanized rubber waste consists of one or more of tyres, boots, inflatable boats and reinforced rubber articles.

15. The plant according to claim 4, wherein the molten NaOH treatment temperature is at most 350° C.

16. The plant according to claim 7, wherein the at least one dilute acid is phosphoric acid.

17. A process for treating vulcanized rubber waste, comprising the steps of:
coarse cutting of the vulcanized rubber waste into fragments,
attacking the fragments using a molten pure base under temperature conditions causing, in the presence of molten pure cast NaOH as the molten pure base, deconsolidation of the vulcanized rubber waste into deconsolidated solid fragments of polymeric composition;
separating the molten base from the deconsolidated solid fragments;
neutralizing the deconsolidated solid fragments;
recycling or reutilizing the neutralized, deconsolidated solid fragments; and
wherein the neutralizing uses phosphoric acid.

18. The process according to claim 17, wherein said separating comprises sedimentation of the deconsolidated fragments, separated beforehand from the molten base, in a settling and neutralizing liquid, and, after removal of the settling and neutralizing liquid, recovery of the deconsolidated fragments.

19. The process according to claim 17, further comprising the step of recycling the molten pure base.

20. The process according to claim 17, wherein the molten NaOH treatment temperature is at most 400° C.

21. The process according to claim 17, wherein the deconsolidated solid fragments comprise metal fragments and fragments made of synthetic material and wherein the process furthermore includes sorting between the metallic and synthetic deconsolidated fragments before they are recycled or reutilized.

22. The process according to claim 17, wherein the deconsolidation takes place in a closed reactor, the waste to be treated being completely immersed.

23. The process according to claim 17, wherein the vulcanized rubber waste consists of one or more of tyres, boots, inflatable boats and reinforced rubber articles.

24. The process according to claim 17, wherein the molten NaOH treatment temperature is at most 350° C.

* * * * *